United States Patent
Higashi et al.

(10) Patent No.: US 8,163,224 B2
(45) Date of Patent: Apr. 24, 2012

(54) MANUFACTURING METHOD OF THREE-DIMENSIONALLY SHAPED OBJECT

(75) Inventors: Yoshikazu Higashi, Moriyama (JP); Satoshi Abe, Moriguchi (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/440,675

(22) PCT Filed: Oct. 23, 2008

(86) PCT No.: PCT/JP2008/069211
§ 371 (c)(1), (2), (4) Date: Mar. 10, 2009

(87) PCT Pub. No.: WO2009/054442
PCT Pub. Date: Apr. 30, 2009

(65) Prior Publication Data
US 2010/0176539 A1    Jul. 15, 2010

(30) Foreign Application Priority Data
Oct. 26, 2007    (JP) .................... 2007-279559

(51) Int. Cl.
G01B 15/00    (2006.01)
G01B 11/00    (2006.01)
G01B 11/04    (2006.01)
G01B 11/08    (2006.01)
G01B 11/10    (2006.01)
B29C 35/08    (2006.01)
H05B 6/00    (2006.01)

(52) U.S. Cl. ......... 264/406; 264/497; 356/388; 356/638

(58) Field of Classification Search .................. None
See application file for complete search history.

(56) References Cited

U.S. PATENT DOCUMENTS
6,483,596 B1 * 11/2002 Philippi et al. ............ 356/614
(Continued)

FOREIGN PATENT DOCUMENTS
JP    8-318574    12/1996
(Continued)

OTHER PUBLICATIONS
Machine translation of JP 2005-133120 A.*
(Continued)

*Primary Examiner* — Christina Johnson
*Assistant Examiner* — Benjamin Schiffman
(74) *Attorney, Agent, or Firm* — Greenblum & Bernstein, P.L.C.

(57) ABSTRACT

An equipment for metal-laser sintering process includes a powder layer forming unit, an irradiation unit which irradiates light beams, a correction target on which a correction mark serving as a fiducial in correction of the irradiation points of the light beams is formed, and an imaging camera which takes an image of the correction mark. The correction target is formed of a material which is melted by irradiation of light beam so as to be formed a through hole. The correction target is disposed on the substrate and the light beams are irradiated to penetrate the correction target so that the correction mark is formed. Subsequently, the imaging camera takes an image of the correction mark and the location of the correction mark is measured, and thus, correction of the irradiation points is performed. Since the correction mark is formed to be a through hole, contrast becomes clear so that location of the correction mark can be measured easily, and the correction of the irradiation points of the light beams can be performed easily.

10 Claims, 7 Drawing Sheets

U.S. PATENT DOCUMENTS

2002/0041818 A1 4/2002 Abe et al.
2004/0228754 A1 11/2004 Abe et al.
2005/0229711 A1 10/2005 Ohms et al.

FOREIGN PATENT DOCUMENTS

JP 2005-133120 5/2005

OTHER PUBLICATIONS

English translation of JP 2005-133120 A.*
English language Abstract of JP 2005-133120, May 26, 2005.
English language Abstract of JP 8-318574, Dec. 3, 1996.

* cited by examiner

FIG.1
(a)
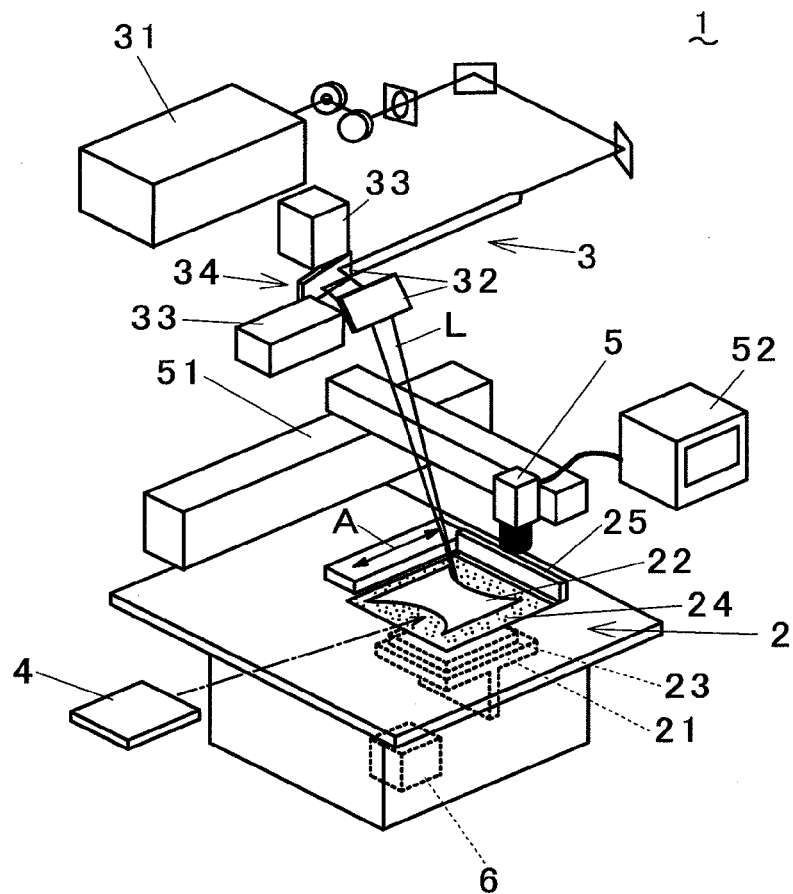
(b)
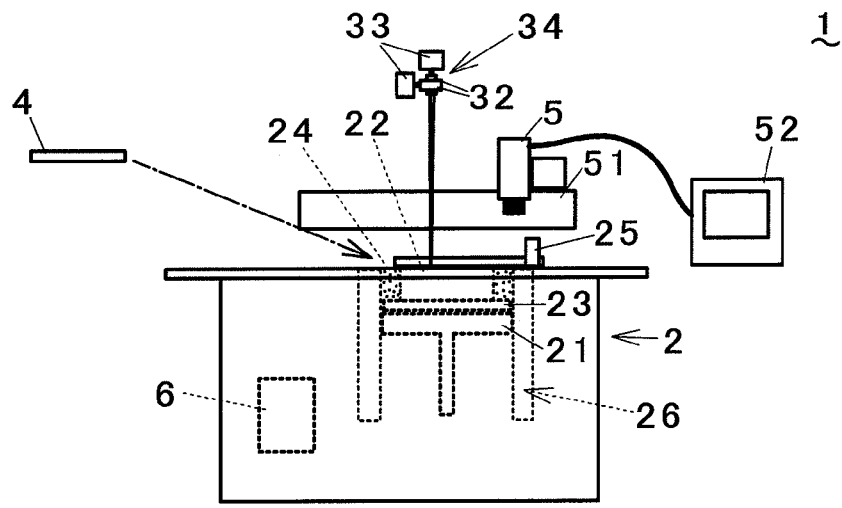

FIG.2
(a)
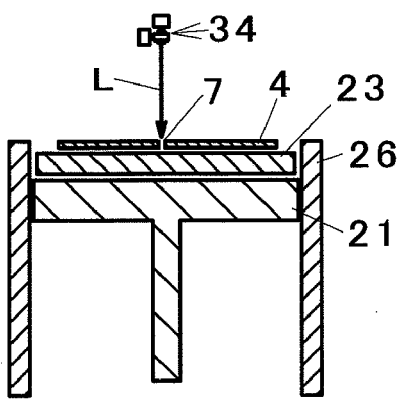
(b)
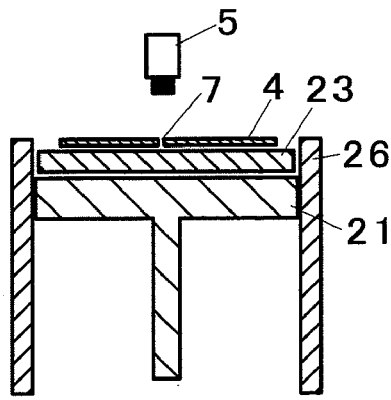
(c)
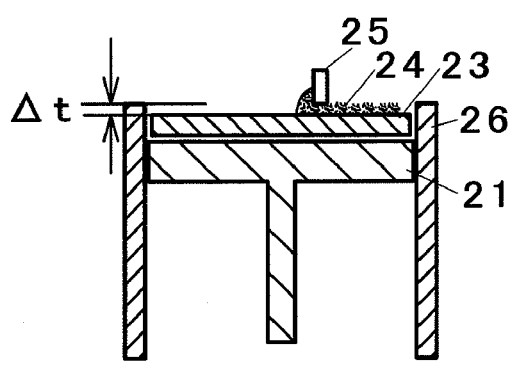
(d)
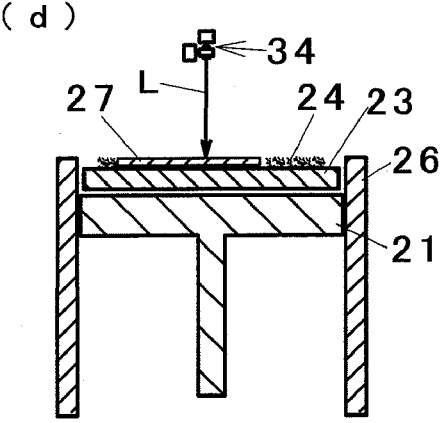
(e)
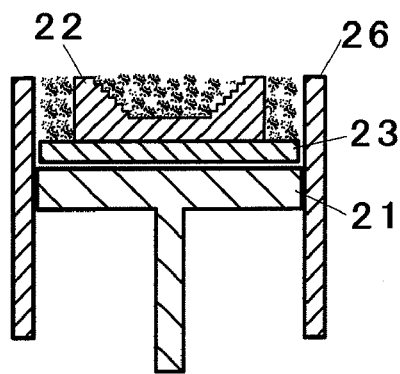

FIG. 4
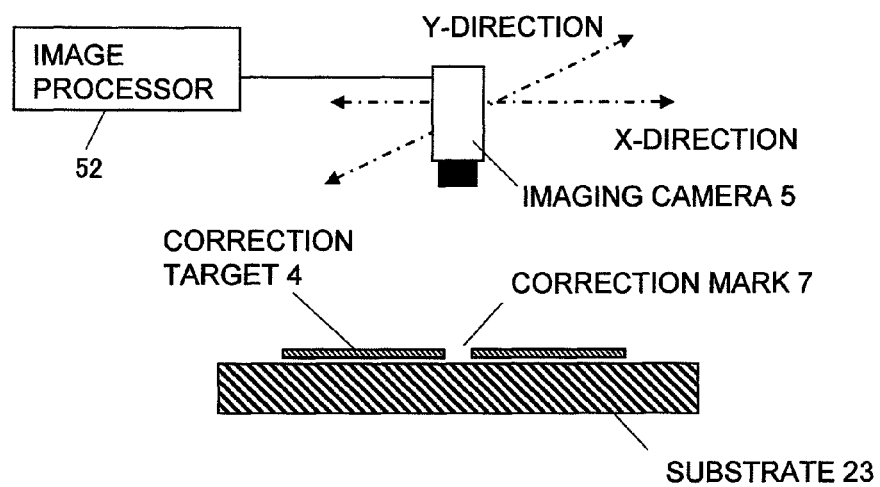
FIG. 5
(a) 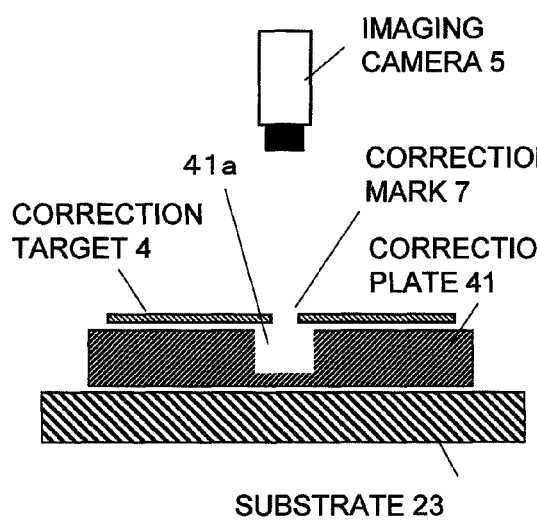
(b) 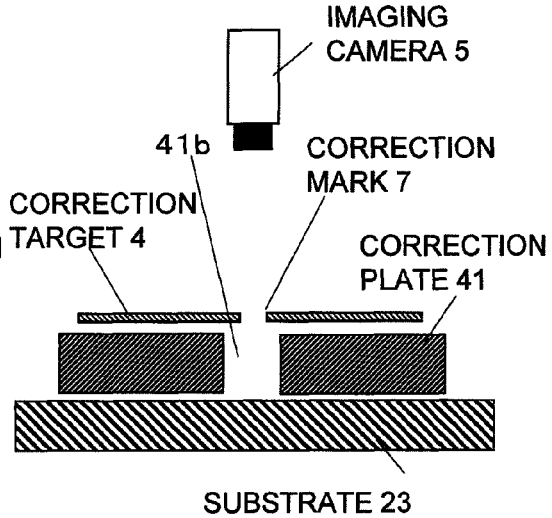

(a)

(b)

MANUFACTURING METHOD OF THREE-DIMENSIONALLY SHAPED OBJECT

TECHNICAL FIELD

The present invention relates to a manufacturing method of three-dimensionally shaped object by irradiating light beams to an inorganic or an organic pulverized material.

BACKGROUND ART

A manufacturing method of three-dimensionally shaped object is conventionally known that light beams are irradiated on a powder layer formed of an inorganic or an organic pulverized material so as to form a sintered layer by melting the powder layer, and repeating processes of forming a new powder layer on the sintered layer and irradiation of light beams. In such a manufacturing method, a $CO_2$ laser is mainly used as a light source of the light beams.

Since the $CO_2$ laser is a gas laser, alignment of a resonance mirror of a light beam oscillator inside delicately changes due to fever with laser oscillation, and thus, characteristics such as divergence angle of the light beams, stability of optical axis of the light beams, and stability of the laser output power may vary. Due to variation of characteristics of the light beams, irradiation points of the laser beams, diameters of the focused laser beams and the laser power may be varied. Alternatively, when YAG laser is used as a light source of the light beams, due to thermal balancing of resonance mirrors at both ends of a YAG rod or thermal expansion of the YAG rod itself, characteristics such as divergence angle of the light beams, stability of optical axis of the light beams, and stability of the laser output power may vary just after starting irradiation of light beams, similar to the $CO_2$ laser, and thus, irradiation points of the light beams, diameters of the focused light beams and the laser power may be varied. Therefore, it is necessary to correct the irradiation points of the light beam and so on. The correction of the irradiation points is carried out by irradiating light beams to a photosensitive paper and measuring positions of traces of irradiation of light beams at which the photosensitive paper is discolored by heat of the light beams.

In such a correction method, the output power of the laser in correction, however, is several watts to several tens watts, and is much smaller than the output power of several hundreds watts when sintering powders, actually. Therefore, since oscillation condition of laser at the time of correction is different from that at the time of sintering powders, thermal condition of light beam oscillator varies, and thus, the irradiation points of the light beams do not coincide with the irradiation positions at the time of sintering powders. Thus, correction of the irradiation points of the light beams cannot be corrected sufficiently.

Another manufacturing method of three-dimensionally shaped object is further known that irradiation points of the laser beams are corrected by forming traces with using substantially the same power as that at the time of sintering powders (see patent document 1, for example).

In the manufacturing method shown in the patent document 1, contrast of the traces of the light beams, however, is obscure, so that irradiation points cannot be corrected sufficiently.

[Patent Documents 1]
Japanese Laid-Open Patent Publication No. 2005-133120

DISCLOSURE OF INVENTION

The present invention is conceived to solve the above mentioned problems and purposed to provide a manufacturing method of three-dimensionally shaped object by which correction of irradiation points of light beams can be performed easily.

For achieving the above mentioned purpose, a manufacturing method of three-dimensionally shaped object in accordance with the present invention comprises: a powder layer forming step to form a powder layer by supplying pulverized material on a substrate; an irradiation step to form a sintered layer by irradiating light beams on the powder layer; a laminating step to laminate the sintered layers by repeating the powder layer forming steps and the irradiation steps, characterized by that the method further comprises a marking step to set a correction target on an irradiation face of the light beams, and to form a mark on the correction target by irradiating laser beams having the same power in the irradiation step; and a correction step to measure a position of the mark formed in the marking step and to correct irradiation points of the light beams based on deviation from the predetermined point, and wherein the correction target is formed of a material which can be penetrated by the light beams by irradiation of the light beams in the marking step.

According to this invention, since the correction target is penetrated by irradiation of the light beams, contrast between the mark and the circumferences thereof becomes distinctive, and thus, location of the mark can be measured easily, and correction of irradiation points of the light beams can be performed easily.

Preferably, the correction target should be set on a plate disposed on the irradiation face, and the plate has a cavity or cavities formed at a position or positions corresponding to the mark. Thereby, since the plate below the mark is a cavity or cavities, the contrast between the mark and the circumferences becomes much clearer, and thus, the location of the mark can be measured easier.

Preferably, the measurement of the location of the mark in the correction step should be performed by illumination the correction target and imaging the contrast due to the irradiation. Thereby, since the mark is illuminated, the contrast between the mark and the circumference becomes much clearer, and thus, the location of the mark can be measured easier.

Preferably, in the marking step, a plurality of the marks should be formed independently each other so as not to be overlapped. Thereby, since each mark is independent without overlapping, the correction target may not be fallen off in marking.

Preferably, the mark should be a cross-shape. Thereby, since the mark is or are the cross-shape, coordinates at a cross position of a longitudinal line and a transversal line can be obtained easily.

Alternatively, the mark should be a circular shape, preferably. Thereby, since the mark is the circular shape, coordinates of a center of a circle can be obtained easier from coordinates of three points on the circle.

BEST MODE TO CARRY OUT THE INVENTION

First Embodiment

A manufacturing method of three-dimensionally shaped object in accordance with a first embodiment of the present invention is described with reference to drawings. FIGS. 1(*a*) and 1(*b*) respectively show a configuration of equipment for metal-laser sintering process used in the manufacturing method, and illustration of a part of a light irradiation unit is omitted in FIG. 1(*b*). The equipment for metal-laser sintering process 1 comprises a powder layer forming unit 2 which spreads metal powder as a layer having a predetermined thickness, a light irradiation unit 3 which outputs light beams L and irradiates the light beams at arbitrary points, and a control unit 6 which controls each unit of the equipment for metal-laser sintering process 1. The powder layer forming unit 2 has a lifting table 21 which moves up and down, a substrate 23 which is disposed on the lifting table 21 and serves as a base of a shaped object 22, a wiper 25 which moves in a direction shown by arrow A and spreads a powder layer 24 of metal powder on the substrate 23, and a molding tank 26 which encloses the lifting table 21.

The light emitting unit 3 comprises a light beam oscillator 31 which oscillates the light beams L, two scanning mirrors 32 which are rotatable and reflect the light beams L from the light beam oscillator 31, and a scanner 33 which controls the rotation angle of the scanning mirrors 32. The control unit 6 adjusts the rotation angles of the scanning mirrors 32 via the scanner 33, so that the light beams L are scanned on the powder layer 24. The scanning mirrors 32 and the scanner 33 constitute a scanning head 34. The light beam oscillator 31 is an oscillator of a $CO_2$ laser or a YAG laser, for example. The equipment for metal-laser sintering process 1 comprises an imaging camera 5 which takes images of a correction mark formed at a position of a correction target 4, an X-Y driving mechanism 51 which moves the imaging camera 5 to positions at which it takes images, and an mage processor 52 which processes the images taken by the imaging camera 5.

The equipment for metal-laser sintering process 1 performs a marking step and a correction step subsequent thereto in order to correct the irradiation points of the light beams L as a preprocessing of molding a three-dimensional shape. In the marking step, the correction target 4 is disposed on the substrate 23. A correction mark which serves as a fiducial which serves as fiducials in correction of the irradiation points of the light beams is or are formed on the correction target 4 by irradiating the light beams L with using the scanning head 34. An image of the correction mark formed on the correction target 4 is taken by the imaging camera 5, and the irradiation points of the light beams are corrected on the basis of the image.

The manufacturing method of three-dimensionally shaped object in the above configured equipment for metal-laser sintering process 1 is described with reference to FIG. 2 and FIG. 3. FIG. 2 shows time series conditions when the manufacturing method is carried out, and FIG. 3 shows a flow thereof. First, as shown in FIG. 2(a), the correction target 4 is disposed on the substrate 23 (Step S1, which is abbreviated as S1, the same goes for the followings). Subsequently, a correction mark 7 is or are formed by irradiating the light beams to the correction target 4 (S2). The correction mark 7 is a cross-shape, but the correction mark 7 may be a circular form, rectangular shape or the like. In the step S2, the laser output power of the light beams 1 is substantially the same intensity of the laser output power when sintering the powder layer. These steps S1 and S2 constitute a marking step.

Subsequently, as shown in FIG. 2(b), the control unit moves the imaging camera 5 to a position above the correction mark 7 by the X-Y driving mechanism, taking an image of the correction mark 7 and measures the location of the correction mark 7 (S3). Then, it judges whether a disagreement between the location of the imaged correction mark 7 and radiation point previously set is smaller than a predetermined quantity or not (S4). When the disagreement is larger than the predetermined quantity, the control unit performs the correction of the irradiation points of the light beams L (S5). Then, the correction target 4 is changed to a new one (S6) and returns to the step S2. These steps S3 to S6 constitute a correction step. Repeating the steps S2 to S6 until the disagreement between the location of the correction mark 7 and the predetermined irradiation point becomes smaller than the predetermined quantity. When the disagreement becomes smaller than the predetermined quantity, the correction target 4 is taken away from the substrate 23. The flow proceeds to subsequent step S7.

As shown in FIG. 2(c), the control unit moves the lifting table 21 downward so that a discrepancy between an upper face of the molding table 23 and an upper face of the molding tank 26 becomes $\Delta t$ (S7). Subsequently, the control unit supplies the metal powders on the substrate 23 by the wiper 25. The wiper 25 moves in horizontal direction on the same level as the upper face of the molding tank 26, so that the powder layer 24 having a thickness $\Delta t$ is formed on the molding table 23 (S8). These steps S7 and S8 constitute a powder layer forming step.

Subsequent to the above step S6, as shown in FIG. 2(d), the control unit renders the scanning head 34 to scan the light beams L at arbitrary points (S9), so that a sintered layer 27 which is integrated with the substrate 23 is formed by melting the powder layer 24 (S10). These steps S9 and S10 constitute an irradiation step.

Subsequent to the above step S10, the control unit judges whether molding is completed or not (S11). When the molding is not completed, the flow returns to the step S7 and performs the steps S7 top S10 repeatedly to laminate the sintered layers 27, as shown in FIGS. 2(c) and 2(d). The steps S7 to S10 constitute a laminating step. Consequently, a shaped object 22 is formed by laminating the sintered layers 27, as shown in FIG. 2(e). The above mentioned correction of the irradiation points of the light beams by the marking step and the correction step may be performed prior to forming the shaped object 22 or may be performed at an optional time while the shaped object 22 is formed. In case of performing the correction of the irradiation points of the light beams while the shaped object 22 is formed, the marking step and the correction step are performed under a state that the correction target 4 is disposed on the powder layer 24 or the sintered layer 27.

Subsequently, the correction step after the marking step is described with reference to FIG. 4. FIG. 4 shows a condition that the imaging camera 5 takes an image of a correction mark 7 formed on the correction target 4. The correction target 4 is disposed on the substrate 23, and the correction mark 7 is formed on the correction target 4 in the marking step. The correction target 4 on which marking should be performed is formed on a material that an irradiated portion thereof is melted to form a through hole when the light beam L is irradiated. The correction target 4 is a white paper sheet having a thickness in a range from 0.05 mm to 0.3 mm, for example. The correction mark 7 is formed as a through hole to pass the light beam through the correction target 4.

The imaging camera 5 is moved in X-direction and in Y-direction by the X-Y driving mechanism 5 so as to be located above the through correction mark 7 and it takes an image of the correction mark 7. The image is analyzed by the image processor 52 and the location of the correction mark 7 is measured. Since the correction mark 7 of the correction target 4 is formed to be a through hole by the irradiation of light beams, contrast between the correction mark 7 and the circumference thereof becomes clear, and thus, the location of the correction mark 7 can be measured easier, and the correction of the irradiation points of the laser beams L can be performed easier.

Second Embodiment

Correction of the irradiation points of the light beams in the manufacturing method of three-dimensionally shaped object in accordance with a second embodiment of the present invention is described with reference to drawings. FIGS. 5(a) and 5(b) respectively show conditions that the imaging camera 5 takes an image of the correction mark 7 formed on the correction target 4. The correction target 4 is disposed on a correction plate 41 having a cavity which clarifies the contrast of the correction mark 7, and the cavity is a counter bore 41a in FIG. 5(a), and the cavity is a through hole 41b in FIG. 5(b). FIG. 6(a) shows a plain view of a correction plate on which the correction target 4 is disposed, and FIG. 6(b) shows a condition of the correction target 4 disposed on the correction plate 41.

In this embodiment, the correction plate 41 is disposed on the substrate 23, and the correction target 4 is disposed on the correction plate 41. Cavities are formed on the correction plate 41 at positions corresponding to the correction mark or correction marks 7 of the correction target 4. The cavity may be a counter bore 41a with no penetration or a through hole 41b. In the examples in FIGS. 6(a) and 6(b), the counter bores 41a or the through holes 41b are formed at nine positions on the correction plate 41, and the correction mark or correction marks 7 is or are formed at positions above the counter bores 41a or the through holes 41b. When imaging the correction mark 7, since the portion below the correction mark 7 is the cavity, the portion of the correction mark 7 becomes dark, and thus, contrast between the correction mark 7 and the circumference thereof becomes clear.

In addition, when the correction target 4 is directly disposed on the substrate 23 as described in the above first embodiment, heat due to the light beams in the marking step may disperse into the substrate 23, and the temperature of the correction target 4 cannot be increased sufficiently so that it is difficult to form the through correction mark 7. In contrast, since the portion below the correction mark 7 is the cavity, the heat due to the light beams may not be dispersed, and thus, through holes of the correction mark 7 can be formed easier. Thereby, the contrast between the correction mark 7 and the circumference thereof becomes clear.

Third Embodiment

Correction of the irradiation points of the light beams in the manufacturing method of three-dimensionally shaped object in accordance with a third embodiment of the present invention is described with reference to drawings. FIG. 7(a) shows a condition that an image of the correction mark 7 located above the counter bore 41a is taken, and FIG. 7(b) shows a condition that an image of the correction mark 7 located above the through hole 41b. In this embodiment, the equipment for metal-laser sintering process 1 comprises an illumination unit 8, and takes an image of the correction mark 7 with illumination by the illumination unit 8. The illumination unit 8 is an incandescent lamp or LEDs, for example. Alternatively, it is preferable to use optical fibers to propagate external lights for irradiation. Even when the cavity on the correction plate 41 is the counter bore 41a, as shown in FIG. 7(a), or even when the cavity on the correction plate 41 is the through hole 41b, as shown in FIG. 7(b), the lights incident into the through correction mark 7 proceed to the beneath cavity, so that the portion of the correction mark 7 is imaged dark, and the lights illuminating the circumference of the correction mark 7 are reflected upwards and thus, the circumference of the correction mark 7 is imaged bright, consequently, the contrast between the correction mark 7a and the circumference thereof becomes clear.

FIG. 8 shown a correction of the irradiation points of the light beams in which the correction mark 7 located above the through hole 41b of the correction plate 41 is illuminated from beneath the correction target 4. In this case, a space is formed between the correction plate 41 and the substrate 23, and the illumination unit 8 is disposed in the space. The correction mark 7 is imaged bright because the lights from the illumination unit 8 pass through the cavity and enters into the imaging camera 5, and the circumference of the correction mark 7 is imaged dark, so that the contrast between the correction mark 7a and the circumference thereof becomes clear.

Fourth Embodiment

Correction of the irradiation points of the light beams in the manufacturing method of three-dimensionally shaped object in accordance with a fourth embodiment of the present invention is described with reference to drawings. FIGS. 9(a) and 9(b) respectively show plain views of the correction target 4 on which correction marks 7 are formed. In this embodiment, the correction marks 7 are formed so as not to be overlapped each other, as show in FIG. 9(a). FIG. 9(b) shows a condition that the correction marks 7 are formed so as to be overlapped and continuous each other. When the correction marks 7 are continuously formed, as shown in FIG. 9(b), since the correction marks 7 are formed by penetrating the light beams through the correction target 4, a hatched portion will drop away, and consequently, the locations of the correction marks 7 cannot be measured. In contrast, by forming the correction marks 7 respectively independent from each other without being overlapped, as this embodiment shown in FIG. 9(a), no part of the correction target 4 drops away, so that the locations of the correction marks 7 can be measured.

Fifth Embodiment

Correction of the irradiation points of the light beams in the manufacturing method of three-dimensionally shaped object in accordance with a fifth embodiment of the present invention is described with reference to drawings. FIG. 10 shows a shape of the correction mark 7. In this embodiment, the correction mark 7 is formed as a cross-shape, and the location of the correction mark 7 is measured as follows. The correction mark 7 is constituted by a longitudinal line 71 and a lateral line 72. Widths of the longitudinal line 71 and the lateral line 72 are selected in a range fit into a field of view of the imaging camera 5, and preferably be equal to or less than a half of the field of view. Since the width of the line is equal to or less than a half of the field of view, even when the field of view is disagreed a little, the location of the correction mark 7 can be measured. First, coordinates of a left boundary 71L and a right boundary 71R of the longitudinal line 71 of the correction mark 7 are measured, and a coordinate of a center line 71C between two boundaries is calculated. Similarly, coordinates of an upper boundary 72U and a lower boundary 72L of the lateral line 72 are measured, and a coordinate of a center line 72C between two boundaries is calculated. Coordinates of a cross point of two center lines 71C and 72C are used as the location of the correction mark 7. In this way, since the correction mark 7 is a cross-shape, the coordinates of a position where the longitudinal line crosses the lateral line can be obtained easily.

Sixth Embodiment

Correction of the irradiation points of the light beams in the manufacturing method of three-dimensionally shaped object in accordance with a sixth embodiment of the present invention is described with reference to drawings. FIG. 11 shows a shape of the correction mark 7. In this embodiment, the correction mark 7 is formed as a circular form. This circle 73 can be formed by circularly scanning the light beams, or by shaping the light beam circularly. A diameter of the circle 73 may preferably be equal to or less than ¾ of the field of view of the imaging camera 5. Since the diameter of the circle is equal to or less than ¾ of the field of view, even when the field of view is disagreed a little, the location of the correction mark 7 can be measured. The location of the correction mark 7 is measured as follows. Coordinates of arbitrary three points 73a, 73b and 73c on outer periphery of the circle 73 are measured. Since a circle passing three points is defined only one, coordinates of the center of the circle are calculated from the coordinates of the measured three points 73a, 73b and 73c. In this way, since the correction mark 7 is a circular shape, the coordinated of the center of the circle can be obtained easily from the coordinates of three points on the circle.

In addition, the present invention is not limited to the configurations of the above mentioned embodiment, and various kinds of modification can be done in a scope without changing the purpose of the present invention. As for the correction target, an acrylic board or a thin steel plate may be used, for example. In such a case, it is possible to obtain substantially the same effects as those in case of using a paper sheet. In addition, the manufacturing method of the present invention may be performed by a complex machine of equipment for metal-laser sintering process having a cutting toot to cut a surface of a three-dimensionally formed object. In such a case, it is possible to obtain substantially the same effects as those in case of using the equipment for metal-laser sintering process. When the present invention is carried out by the complex machine of equipment for metal-laser sintering process, the imaging camera 5 may be attached to a milling head for the cutting tool. Thereby, the X-Y driving mechanism 51 becomes unnecessary causing the cost reduction, and the coordination system of the milling head and the coordination system of the light beams can be coincided with each other, so that processing accuracy of the complex machine of equipment for metal-laser sintering process can be increased.

This application involves claim of priority based on Japan Patent Application No. 2007-279559. Entirety of description of the application is incorporated in this application by reference.

BRIEF DESCRIPTION OF DRAWINGS

FIG. 1(a) is a perspective view of equipment for metal-laser sintering process which is used for a manufacturing method in accordance with a first embodiment of the present invention, and FIG. 1(b) is a front view of the equipment for metal-laser sintering process.

FIG. 2 is a drawing showing time series conditions of the manufacturing method.

FIG. 4 is a drawing showing a condition to take an image of a correction mark in the manufacturing method.

FIG. 5(a) is a drawing showing a condition to take an image of a correction mark above a counter bore in a correction step of irradiation points of light beams in a manufacturing method in accordance with a second embodiment of the present invention, and FIG. 5(b) is a drawing showing a condition to take an image of a correction mark above a through hole in the correction step.

Figure 3:
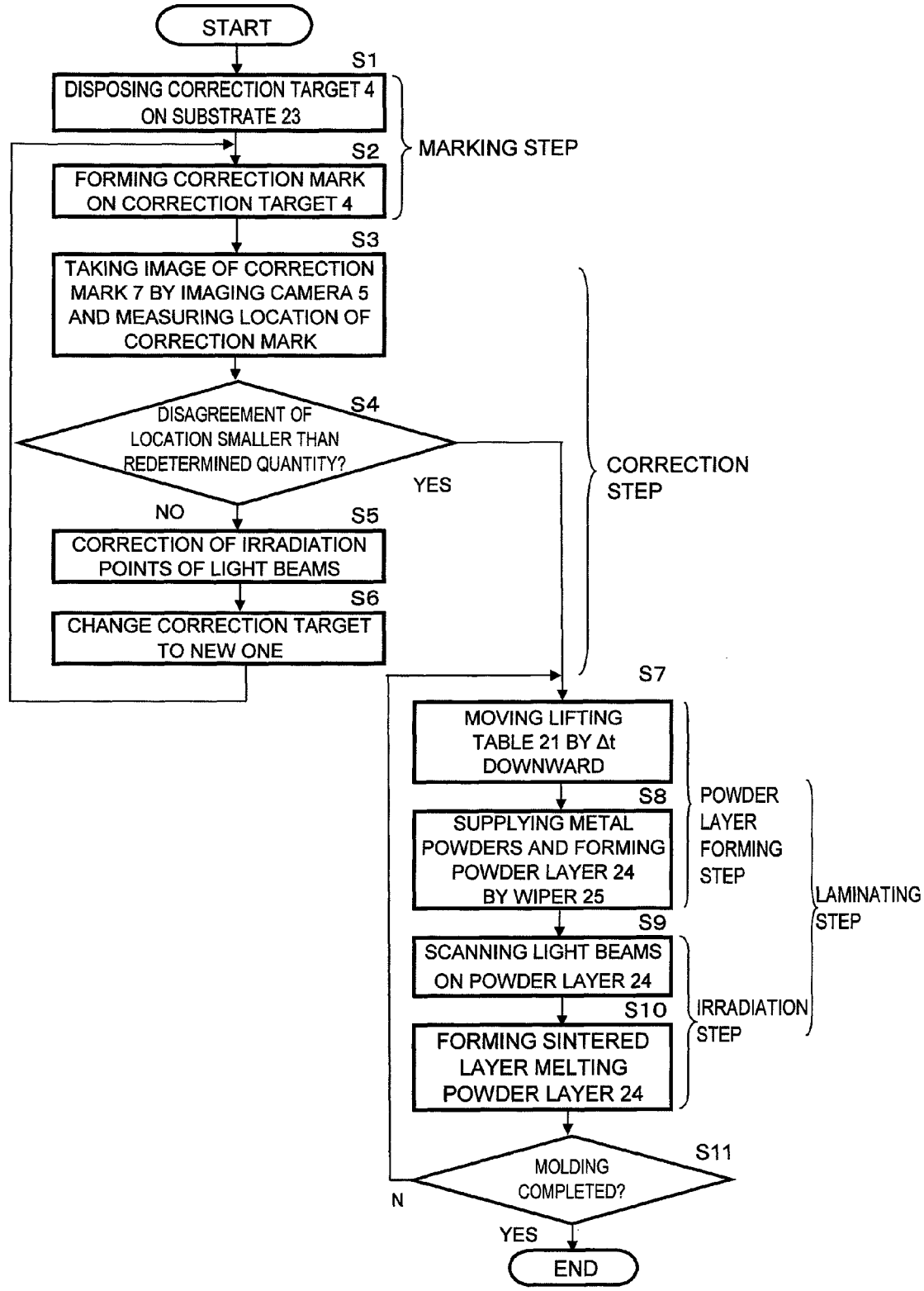
FIG. 3 is a flowchart of the manufacturing method.
Figure 6:
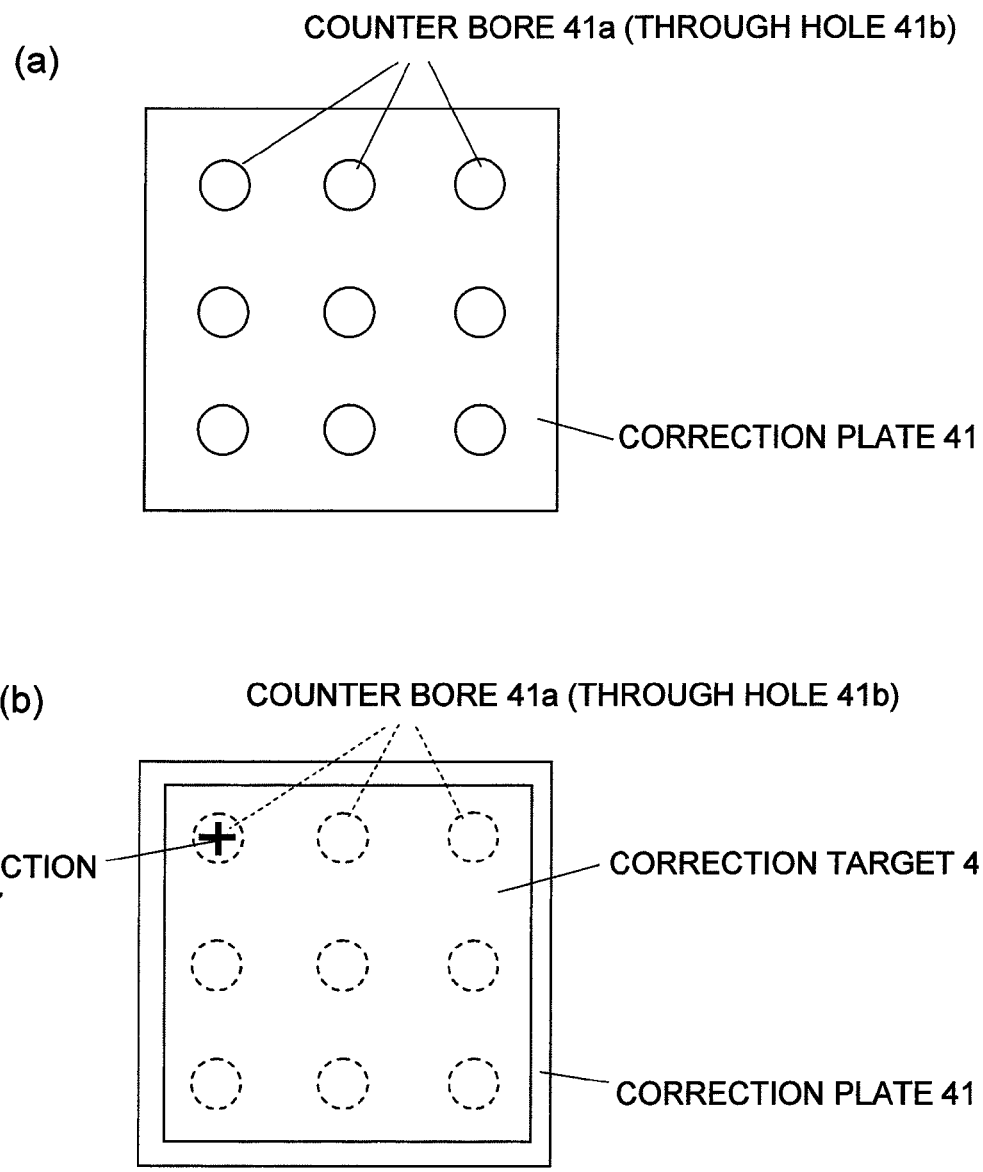
FIG. 6(a) is a plain view of a correction plate used in the correction step.
FIG. 6(b) is a plane view of a correction target disposed on the correction plate.
Figure 7:
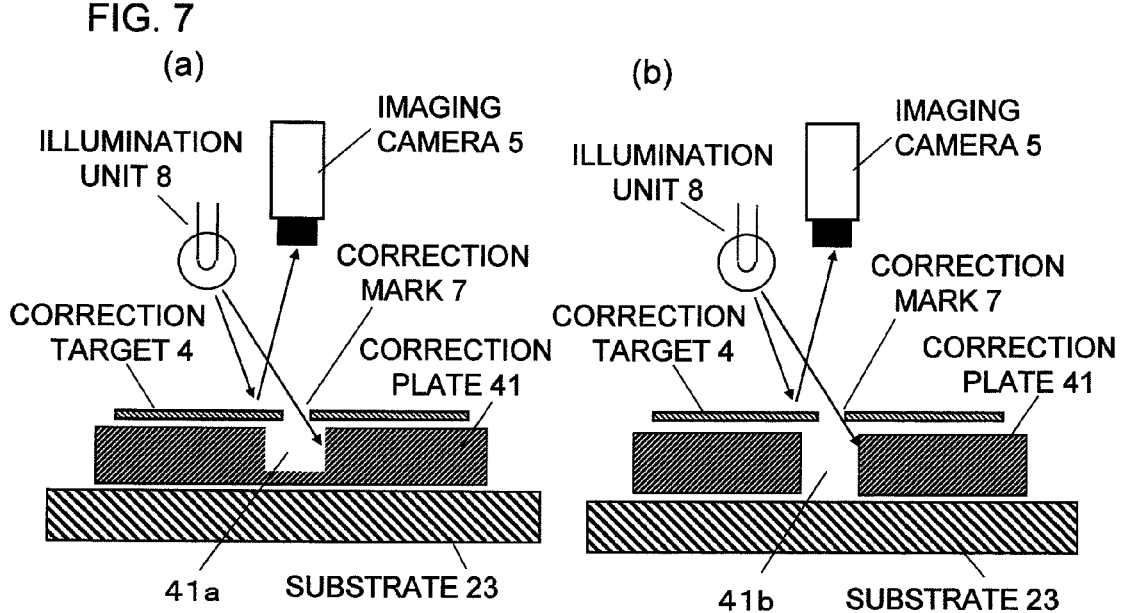
FIG. 7(a) is a drawing showing a condition to take an image of a correction mark above a counter bore with irradiation in a correction step of irradiation points of light beams in a manufacturing method in accordance with a second embodiment of the present invention.
FIG. 7(b) is a drawing showing a condition to take an image of a correction mark above a through hole with irradiation in the correction step.
Figure 8:
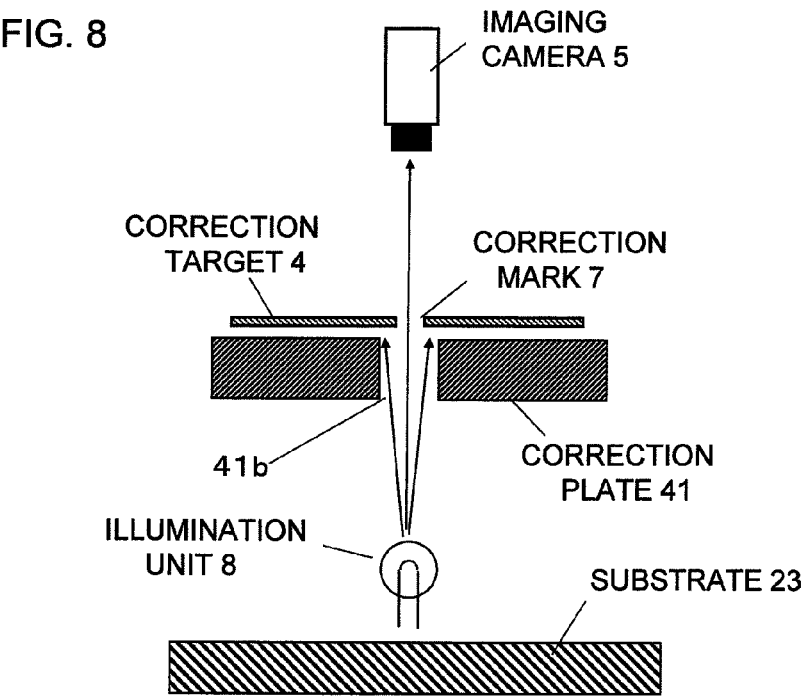
FIG. 8 is a drawing showing a condition to take an image of a correction mark with illumination from beneath used in the correction step.
Figure 9:
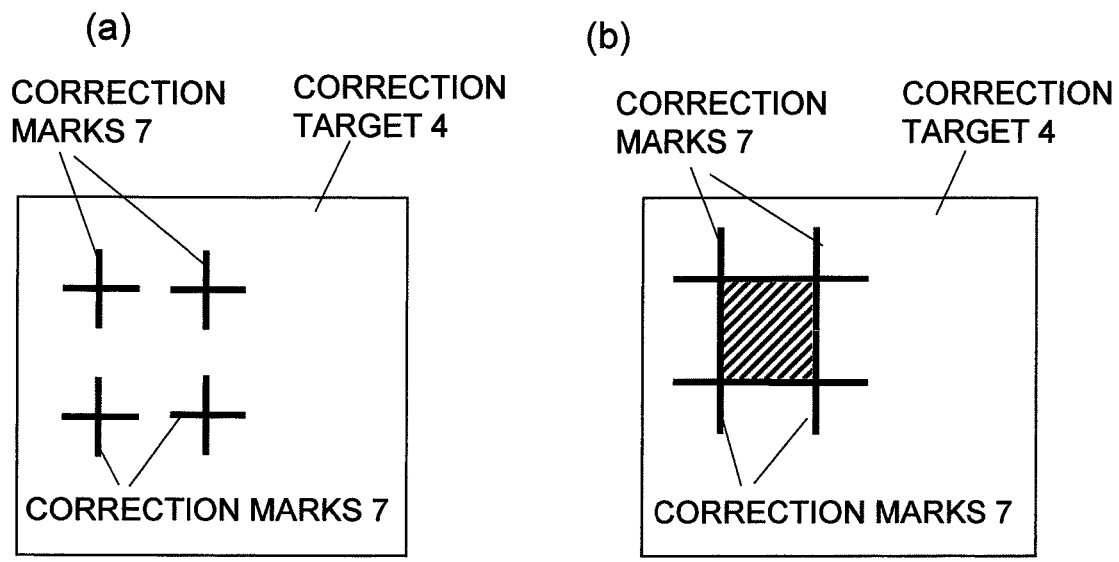
FIG. 9(a) is a plain view of correction marks used in a correction step of irradiation points of light beams in a manufacturing method in accordance with a fourth embodiment of the present invention.
FIG. 9(b) is a plain view of correction marks which are formed to be overlapped and continuous with each other.
Figure 10:
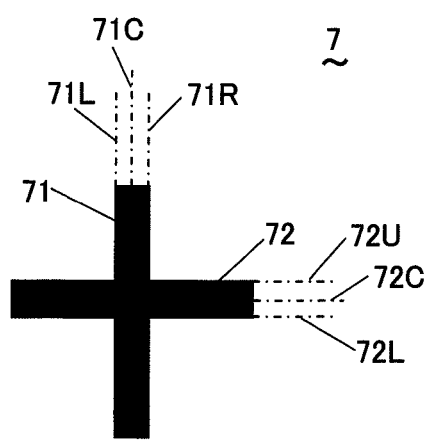
FIG. 10 is a plain view of a correction mark used in a correction step of irradiation points of light beams in a manufacturing method in accordance with a fifth embodiment of the present invention.
Figure 11:
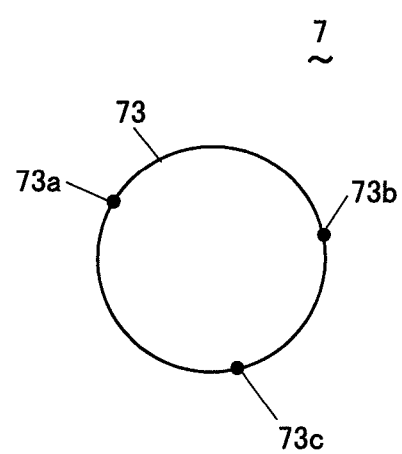
FIG. 11 is a plain view of a correction mark used in a correction step of irradiation points of light beams in a manufacturing method in accordance with a sixth embodiment of the present invention.

The invention claimed is:

1. A method of manufacturing three-dimensionally molded articles, the method comprising:
   forming a powder layer by supplying pulverized material on a molding plate;
   forming a sintered layer by irradiating light beams on the powder layer;
   laminating the sintered layer by repeating the powder layer forming and the irradiation the method further comprising:
   disposing a correction plate, having a cavity or cavities provided at a predetermined position or predetermined positions, on the molding plate;
   setting a correction target on the correction plate;
   forming a mark or marks, at a position or positions corresponding to the cavity or the cavities, on the correction target by irradiating laser beams having a same power as in the radiation of the powder layer, so as to penetrate the correction target;
   measuring a position of the mark or positions of the marks formed in the marking, and correcting irradiation points of the light beams based on deviation from a predetermined point; and
   measurement of the position of the mark or positions of the marks in the correction is performed by illuminating the correction target and imaging the contrast due to the illumination.

2. The method of manufacturing three-dimensionally molded articles in accordance with claim 1 wherein in the marking, a plurality of the marks are formed independently of each other so as to not overlap.

3. The method of manufacturing three-dimensionally molded articles in accordance with claim 2 wherein the mark has or the marks have a cross-shape.

4. The method of manufacturing three-dimensionally molded articles in accordance with claim 2, wherein the mark has or the marks have a circular shape.

5. The method of manufacturing three-dimensionally molded articles in accordance with claim 1, wherein the mark has or the marks have a cross-shape.

6. The method of manufacturing three-dimensionally molded articles in accordance with claim 1, wherein the mark has or the marks have a circular shape.

7. The method of manufacturing three-dimensionally molded articles in accordance with claim 1, wherein the mark or marks are each formed by irradiation of the laser beams.

8. The method of manufacturing three-dimensionally molded articles in accordance with claim 1, wherein the mark or marks penetrate from one surface of the correction target to a second opposite surface of the correction target.

9. The method of manufacturing three-dimensionally molded articles in accordance with claim 1, wherein the correction target is distinct from the plate.

10. The method of manufacturing three dimensionally molded articles in accordance with claim 1, said cavity or cavities of the correction plate being positioned in an overlying relationship with the mark or marks of the correction target.

* * * * *